United States Patent Office 3,325,548
Patented June 13, 1967

3,325,548
METHOD FOR THE PREPARATION OF ALKOXYETHOXYETHYL CHLORIDES
Frank M. Majewski, Philadelphia, and Joseph M. Rzonca, Cornwell Heights, Pa., assignors to Rohm & Haas Company, Philadelphia, Pa., a corporation of Delaware
No Drawing. Continuation of application Ser. No. 268,539, Mar. 28, 1963. This application Apr. 1, 1966, Ser. No. 539,584
4 Claims. (Cl. 260—615)

This application is a continuation of U.S. application Ser. No. 268,539, filed Mar. 28, 1963, and now abandoned.

This invention relates to an improved process for the preparation of alkoxyethoxyethyl chlorides from the corresponding alcohols. The invention deals more particularly with the preparation of alkoxyethoxyethyl chlorides in high yields, consistently 88% and higher.

The object of the present invention is to conduct the preparation of alkoxyethoxyethyl chlorides in such a manner that a minimum of wasteful undesired compounds are formed. Appreciable amounts of undesired side products plague the processes of the prior art requiring tedious time-consuming efforts of separation of the desired product. Another purpose of this improved process is to provide the alkoxyethoxyethyl chlorides from the corresponding alcohols with a high degree of conversion such that it is necessary to recycle little of the alkoxyethoxyethanol in each succeeding reaction or unnecessary to recycle at all.

Alkoxyethoxyethyl chlorides have been commercially prepared for years by a reaction involving alkoxyethanol, ethylene and chlorine. In this reaction, the alkoxyethanol is in an agitated vessel and ethylene and chlorine are introduced simultaneously at separate ports at a controlled temperature to produce the alkoxyethoxyethyl chlorides. In conducting the reaction in this manner, however, a considerable number of undesired by-products are formed, which are wasteful to the reactants involved. For example, ethylene and chlorine can react directly to produce ethylene dichloride. The by-product, hydrogen chloride, can react with the alkoxyethanol to produce alkyl chlorides and chlorohydrin. Besides these compounds, dichloroethyl ether is also formed in appreciable quantities, as well as triglycol dichloride.

A major objection of the preparation of alkoxyethoxyethyl chloride by a reaction involving alkoxyethanol, ethylene and chlorine is that in order to obtain a reasonable yield of 60–70% based on the alkoxyethanol charge, it is necessary to use two to four or more times the amount of alkoxyethanol required theoretically for the reaction. Part of this alkoxyethanol is recovered at the end of the reaction to be recycled in the succeeding reaction, but a large part of this excess reacts in one form or another, with either the ethylene or the chlorine or the hydrogen chloride by-product in various combinations to produce the by-products referred to above.

On the other hand, the by-products formed by the reaction involving the alkoxyethanol, ethylene and chlorine indicated above have boiling points that are very close together, making their separation difficult. Thus, ethylene dichloride boils closely to butyl chloride. The by-product, dichloroethyl ether, distills very closely to butyl Cellosolve, one of the alkoxyethanols very often used. This makes the recovery of by-products very difficult and none of them can be isolated in sufficient purity for sale as reasonably pure materials because of contamination with interfering closely-boiling fractions.

The process based on the preparation of alkoxyethoxyethyl chloride is, therefore, limited in commercial application and is therefore restricted because of low yield of desired products and tedious and difficult techniques required to separate the undesired side-products. Besides this, a considerable excess of the major reactant, the alkoxyethanol, must be employed, recycling it each time after recovery by distillation to the succeeding reaction. This results in a duplication of effort. All of this increases the time and cost of producting the desired product, the alkoxyethoxyethyl chloride.

It has now been found quite unexpectedly and contrary to reports and literature, that alkoxyethoxyethyl chloride can be made in good yield by reacting the corresponding alcohol with phosphorus trichloride under certain conditions and subsequently neutralizing the products of reaction and refluxing them under control conditions. It has been found by defining the conditions of reaction that the alkoxyethoxyethyl chloride can be made in yields in the order of 88% and above; and under conditions, wherein a minimum of by-products are formed. Specifically, in the present process only 6 pounds of by-products are formed per 100 pounds of finished product; whereas, in the old process involving the alkoxyethanol reaction with ethylene and chlorine, a total of 113 pounds of by-products are formed per 100 pounds of finished product. The new process also has the advantage that the amount of alkoxyethanol recycled in the process is less than one-half of that recycled in the old process involving ethylene and chlorine.

The present process is conducted by reacting one mole of alkoxyethoxyethanol, in which the alkyl part contains 1 to 12 carbon atoms, with 0.2 to 0.5 mole of phosphorus trichloride at a temperature of 50 to 90° C., preferably 50 to 80° C. For the best results, it is preferable to add the phosphorus trichloride at a rate substantially equal to that at which it reacts. After the phosphorus trichloride has been added, the temperature is increased to 120° to 170° C., preferably 130° to 150° C. until no more reaction occurs, as evident by the cessation of evolution of hydrogen chloride. When no more hydrogen chloride is evolved, the first stage of the reaction is considered complete.

The reaction mixture is cooled and then neutralized until pink to phenolphthalein. This can be accomplished by the addition of sodium hydroxide, potassium hydroxide, or the like. Convenient concentrations, such as aqueous 25% sodium hydroxide, are effective. Higher concentrations of alkali are preferably avoided since inorganic salts formed may not be entirely soluble in the reaction system.

After the completion of neutralization, the reaction mixture is gradually heated and additional alkali is added, if and as needed, to keep the pH of the reaction mixture decidedly in the alkaline range, preferably enough to maintain the pH of the reaction mixture at about 10 to 12. The reaction mixture is then heated to the reflux temperature and maintained at that temperature until the reaction is complete. In this reaction some of the by-products, notably the ester of alkoxyethoxyethanol, containing phosphorus, are hydrolyzed to the alkoxyethoxyethanol and the sodium salt containing phosphorus. This permits subsequent recovery of the alkoxyethoxyethanol for recycle and reuse. The chloride esters of the alkoxyethoxyethanol, on the other hand, are more stable and do not hydrolyze under these conditions. The completion of the reaction can be determined by allowing the reaction mixture to cool to at least 10° C. below the reflux temperature and observe the formation of layers in the reaction mixture. When two reasonably distinct layers are formed, an upper organic and a lower aqueous, the reaction is complete. When the reaction is less than complete an intermediate layer can be observed. This intermediate layer disappears upon subsequent heating at the reflux temperature. The total time necessary for heating at reflux can be readily determined from one trial run as will be readily apparent to one skilled in the art.

At the conclusion of the reaction the organic layer is separated from the aqueous layer and the desired alkoxyethoxyethyl chloride isolated by distillation. The organic layer is composed fundamentally of two components, the desired alkoxyethoxyethyl chloride and the corresponding alkoxyethoxyethanol. The desired chloride boils at a significantly distinct lower temperature from that of the corresponding alcohol and separation by distillation is quite satisfactory. Conveniently, the chloride product is removed by distillation at atmospheric or somewhat reduced pressure leaving behind the corresponding alcohol which can be reused as such in subsequent runs of the present process. After separation the chloride product is ready for many known useful applications such as conversion to thiocyanate by reaction with sodium thiocyanate to form useful pesticides.

The present process is readily conducted, easily reproducible, and consistently gives high yields of high purity product.

The present invention can be more fully understood from the follownig illustrative example which is offered by way of illustration and not by way of limitation. Parts by weight are used throughout.

Example 1

There is provided a reaction system comprising a 2-liter, 3-necked flask having a glass shaft agitator, a ground glass stuffing box, a half-moon agitator, a thermometer, a reflux condenser, a 250-cc. dropping funnel, calcium chloride breathing tube and an inlet tube extended to below the liquid surface. Heat is applied by electrical means. There is added to the flask, 700 parts of 2-($\beta$-butoxyethoxy)ethanol and held at 70° C. There is added slowly over a period of one hour 192 parts of phosphorus trichloride during which time the reaction mixture is agitated while being held at 70° C. After the completion of the addition of phosphorus trichloride the temperature of the reaction mixture is heated gradually to 130° C. The mixture is held at this temperature for two hours and then cooled to 70° C. The reaction mixture held at 70° C. is gradually added to 475 parts of a caustic solution containing 25 parts of sodium hydroxide per 100 parts of solution. This caustic solution has been previously heated to and held at 70° C. The reaction mixture is then gradually added to the caustic solution over a half-hour period during which time the reaction mixture is agitated and the entire mixture heated to 85° C. Additional caustic solution is added in 10 part increments until the reaction mixture is pink to phenolphthalein. The reaction mixture is then heated to reflux in 15 to 20 minutes (102–104° C.) and held at this temperature for two hours. During this two-hour period the reaction mixture is periodically tested for alkalinity with phenolphthalein indicator. When the reaction mixture is not pink to phenolphthalein there is added 15 to 30 parts of an aqueous 25% sodium hydroxide solution. The alkalinity of the reaction mixture is maintained between 10.5 and 11 pH. At the end of two hours of refluxing the reaction temperature is cooled to 90° C. and allowed to separate into two layers. The lower aqueous layer is removed and discarded leaving the upper organic layer which contains the product.

The organic layer is distilled in a column packed with glass helices and the product recovered at 102° to 106° C. at 15 mm. mercury. The remainder of the organic layer is 2-($\beta$-butoxyethoxy)ethanol which is available for reaction in subsequent runs.

The product is analyzed for chlorine content which indicates a purity of 99.5 to 100%. The product is identified as 2-($\beta$-butoxyethoxy)ethyl chloride.

Similarly, there may be prepared the other chlorides of this invention from their alcohols, such as ethoxyethoxyethanol, hexoxyethoxyethanol, methoxyethoxyethanol, octoxyethoxyethanol, and the like.

We claim:
1. The process for producing alkoxyethoxyethyl chlorides in high yield comprising reacting an alkoxyethoxyethanol in which the alkyl part contains 1 to 12 carbon atoms with phosphorus trichloride, the reaction system being maintained at a temperature range of 50° to 90° C. until all of the phosphorus trichloride has been introduced, thereafter raising the temperature and maintaining it in the range of 120° to 170° C. until no more reaction occurs, cooling the reaction mixture, neutralizing by adding alkali until pink to phenolphthalein and while maintaining the pH in the alkaline range reheating to the reflux temperature until the reaction is complete, wherein there is employed 0.2 to 0.5 mole of said phosphorus trichloride per mole of said alkoxyethoxyethanol.

2. The process according to claim 1 wherein the temperature of the reaction system is maintained at 50° to 80° C. until all of the phosphorus trichloride has been introduced and in which after said neutralizing, the reaction system is maintained in a pH range of about 10 to 12.

3. The process according to claim 1 wherein the said phosphorus trichloride is added to said alkoxyethoxyethanol at a rate substantially equal to that at which it reacts and in which at the conclusion of the reaction, the reaction mixture is allowed to separate into layers for the isolation of the product from the upper organic layer.

4. The process according to claim 1 wherein the alkoxyethoxyethanol employed is 2-($\beta$-butoxyethoxy)ethanol and the product is 2-($\beta$-butoxyethoxy)ethyl chloride.

References Cited

UNITED STATES PATENTS 2,817,686  12/1957  Cicero et al. _____ 260—615 X
2,837,574  6/1958  Hill et al. _____ 260—615

OTHER REFERENCES 1,057,814  11/1953  France.

FOREIGN PATENTS

Karvone: Chem. Zentr., vol. 83 (1912), pp. 1266–1271.
Koslapoff: Organophosphorous Compounds (1950), John Wiley & Sons, Inc., New York, pp. 180–188.
Smith: Organic Synthesis, vol. 23 (1943), pp. 32–33.

LEON ZITVER, *Primary Examiner.*

BERNARD HELFIN, *Examiner.*

HOWARD T. MARS, *Assistant Examiner.*